(12) United States Patent
Ward, Jr.

(10) Patent No.: US 9,435,511 B1
(45) Date of Patent: Sep. 6, 2016

(54) CORRUGATED LENS LED LIGHT BAND

(71) Applicant: Lektron LED Technologies, LLC, Tulsa, OK (US)

(72) Inventor: Larry G. Ward, Jr., Bixby, OK (US)

(73) Assignee: Lektron LED Technologies, LLC

(*) Notice: Subject to any disclaimer, the term of this patent is extended or adjusted under 35 U.S.C. 154(b) by 281 days.

(21) Appl. No.: 14/197,963

(22) Filed: Mar. 5, 2014

(51) Int. Cl.
  *B29D 11/00* (2006.01)
  *F21V 5/04* (2006.01)
  *F21K 99/00* (2016.01)

(52) U.S. Cl.
  CPC ............... *F21V 5/045* (2013.01); *F21K 9/00* (2013.01); *B29D 11/00317* (2013.01)

(58) Field of Classification Search
  CPC ........ G02B 5/1847; F21V 5/045; F21K 9/00
  See application file for complete search history.

(56) References Cited

U.S. PATENT DOCUMENTS 4,374,690 A * 2/1983 Canterino ............... B29C 55/10
  156/229
6,325,880 B1 * 12/2001 Yamashita ....... B29D 11/00278
  156/209

* cited by examiner

*Primary Examiner* — Thomas M Sember
(74) *Attorney, Agent, or Firm* — Frank J. Catalano; Gable Gotwals

(57) ABSTRACT

An LED light band has a thin elongated housing with an open front face covered by an elongated transversely corrugated polycarbonate lens having crests and nadirs spaced at a first predetermined interval. A linear array of LEDs extending behind and along the bottom edge of the lens are spaced at a second predetermined interval different from the first. Because of the difference in the intervals, the light dispersion from the lens appears to the eye to be random so that, for example, a red lens can be used to suggest the presence of licking flames. The polycarbonate lens can be made by pressing long narrow lengths of flat polycarbonate in a sheet metal press.

3 Claims, 4 Drawing Sheets

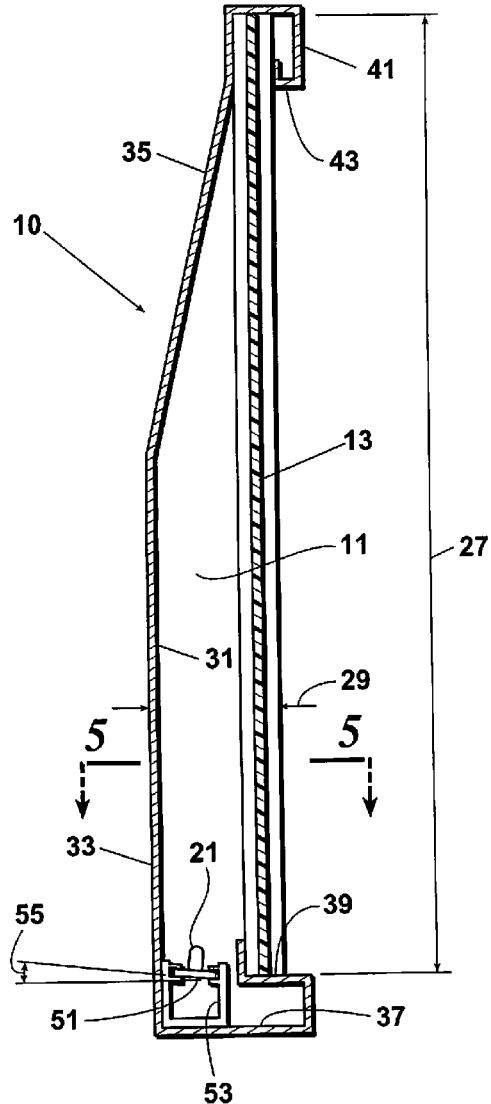
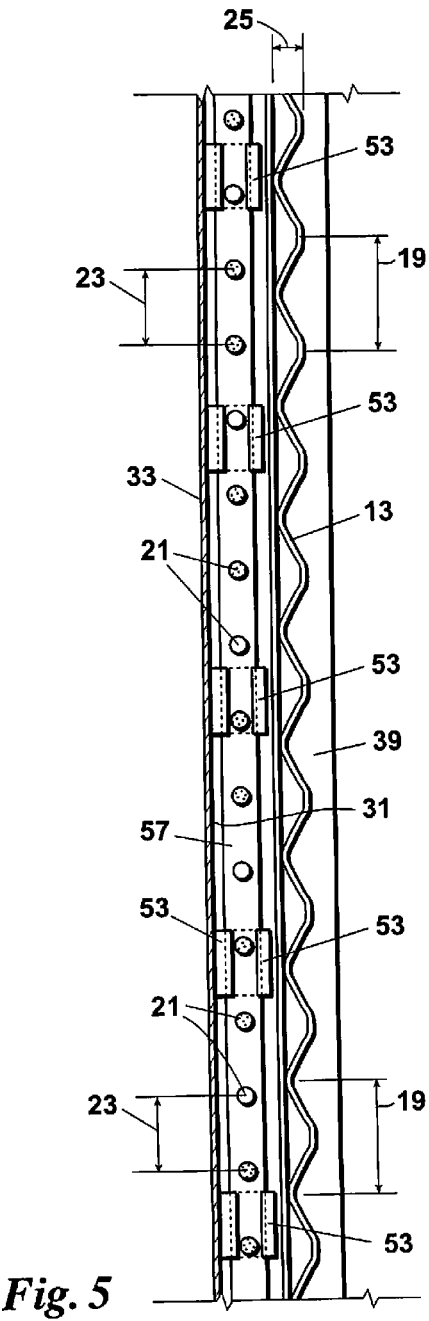
*Fig. 4*
*Fig. 5*

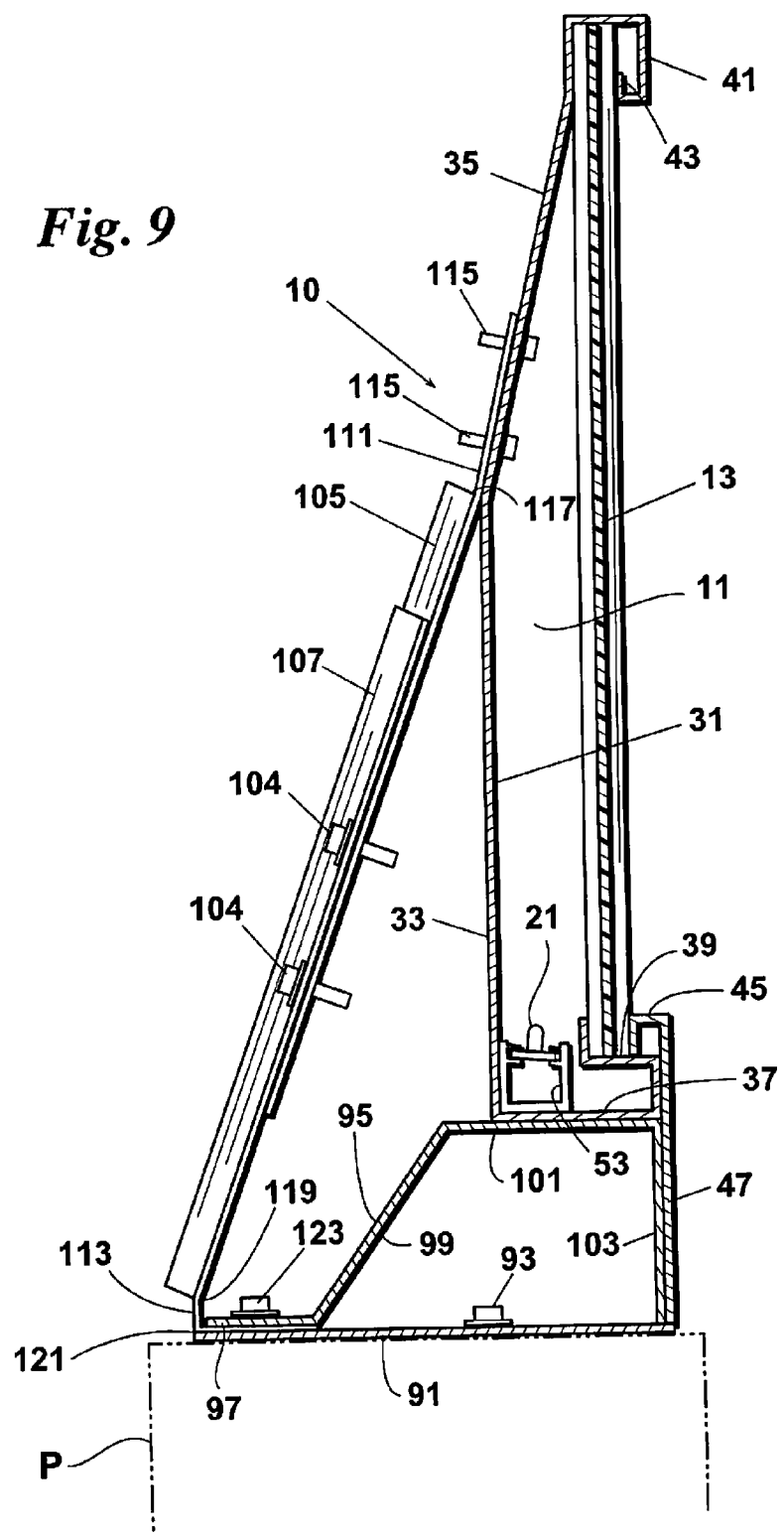

CORRUGATED LENS LED LIGHT BAND

BACKGROUND OF THE INVENTION

This invention relates generally to lighting fixtures and more particularly concerns the use of LED light bands in creating lighting effects.

LED technology can be used to facilitate simulation of natural phenomena. The shapes of the LED housings, the reflective and refractive qualities of the lenses and the configurations of the arrays, colors and diffusion patterns of the LEDs can be coordinated to produce a wide variety of effects. But the use of such coordination to produce, for example, attractive "twinkling starlight" or "licking flames" simulations, often comes with a high price tag.

One of the problems in some applications is that sheets of polycarbonate material, unlike metal sheets, cannot be economically, if at all, cold pressed. Polycarbonate LED lighting lenses are economical and, using presently known technology, crests and nadirs can, in some applications, be shaped into a sheet of polycarbonate material using a "wavy" roller. However, the rollers are limited in length so the nadirs and crests must run parallel to the length of the material. Thus, known technology cannot be used to create an elongated lens of polycarbonate with transverse crests and nadirs. But an elongated lens of polycarbonate with transverse crests and nadirs could be useful in the creation of attractive LED effects in long bands without any visual interruption of the simulated phenomena.

It is, therefore, an object of this invention to provide a relatively inexpensive elongated lens of polycarbonate with transverse crests and nadirs. It is also an object of this invention to provide a relatively inexpensive lens of polycarbonate capable of contributing to the attractive simulation of certain visual phenomena and images. A further object of this invention is to provide an LED light band which is capable of simulation of certain visual phenomena and images, such as "licking flames."

SUMMARY OF THE INVENTION

In accordance with the invention, an LED light band has a thin elongated housing with an open front face covered by an elongated polycarbonate lens. The lens has transverse corrugations with crests and nadirs at a first predetermined interval and a linear array of LEDs extending behind and along the bottom edge of the lens. The LEDs of the array are spaced at a second predetermined interval. The first and second predetermined intervals are different so that the lens display appears to be random.

The first predetermined interval is preferably greater than the second. The ratio of the first to second predetermined intervals is preferably approximately ⅔. Preferably, the first predetermined interval is approximately 2½" and the second predetermined interval is approximately 1⅔" with the depth of the corrugation from crest to nadir being approximately ½", the height of the lens being approximately 15" and the depth of the housing being approximately 2½".

The housing has a rear wall with a lower vertical portion and a forwardly tilted upper portion. The base of the housing extends forwardly from the bottom of the lower vertical portion. Upper and lower opposed channels are attached to the top of the forwardly tilted upper portion and to the forward edge of the lower vertical portion, respectively, for sliding reception of the lens therebetween.

The linear array of LEDs are mounted on an elongated LED circuit board pitched toward the lens by a bracket extending lengthwise in the housing behind the lens and along the junction of the rear wall and base of the housing. The angle of the pitch is approximately 12°.

BRIEF DESCRIPTION OF THE DRAWINGS

Other objects and advantages of the invention will become apparent upon reading the following detailed description and upon reference to the drawings in which:

FIG. 4 is a cross-sectional view taken along the line 4-4 of FIG. 2;

FIG. 5 is a cross-sectional view taken along the line 5-5 of FIG. 4;

FIG. 9 is a cross-sectional view of the LED light band of FIG. 1 mounted on a parapet.

While the invention will be described in connection with a preferred embodiment thereof, it will be understood that it is not intended to limit the invention to that embodiment or to the details of the construction or arrangement of parts illustrated in the accompanying drawings.

DETAILED DESCRIPTION

Figure 1:
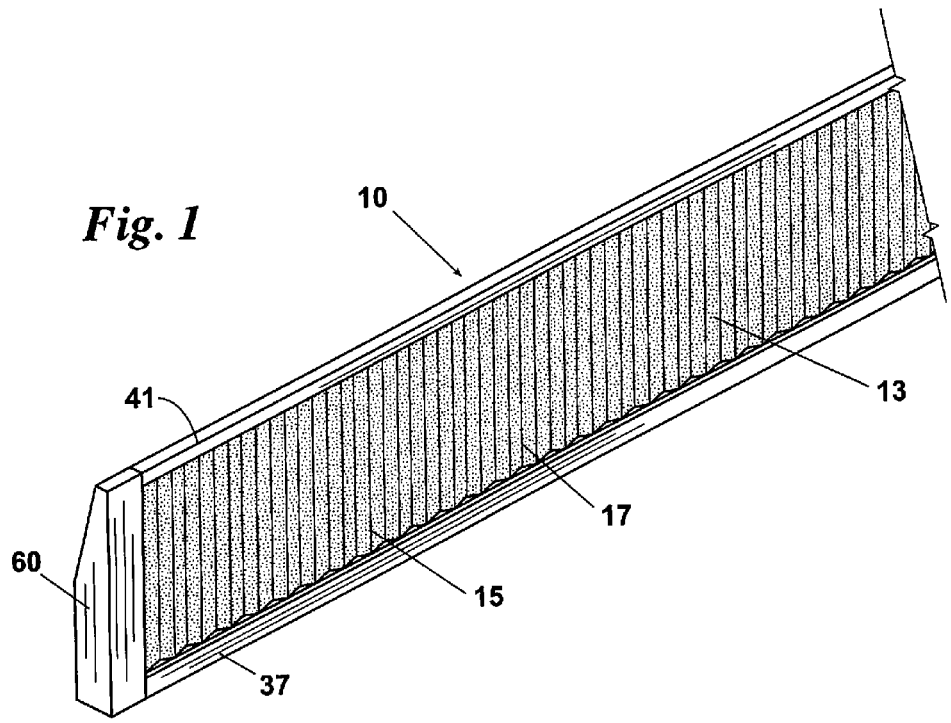
FIG. 1 is a perspective view of the LED light band.
Figure 2:
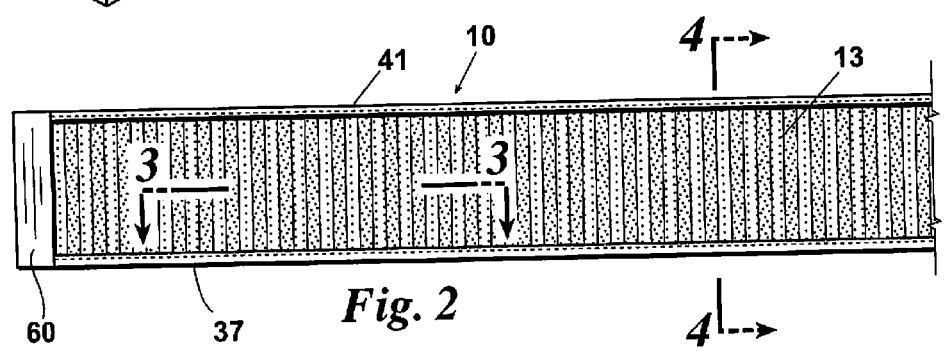
FIG. 2 is a front plan view of the LED light band of FIG. 1.
Figure 3:
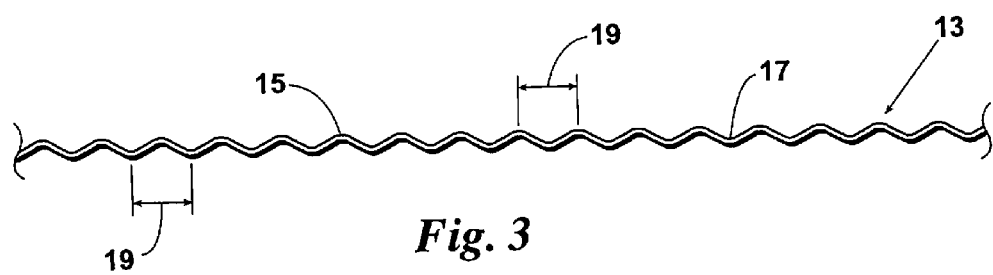
FIG. 3 is a cross-sectional view taken along the line 3-3 of FIG. 2.

Looking first at FIGS. 1-3, an LED light band 10 includes a thin, elongated housing 11 with an open front face covered by an elongated polycarbonate lens 13. The lens 13 is transversely corrugated to provide vertically aligned crests 15 or nadirs 17 spaced at a first predetermined interval 19, respectively.

Turning to FIGS. 4-5, a linear array of LEDs 21 extends behind and along the bottom edge of the lens 13. The LEDs 21 of the array are spaced at a second predetermined interval 23. As best seen in FIG. 5, the first and second predetermined intervals 21 and 23 are different. Therefore, the angles of reflection between consecutive LEDs 21 and the corrugated lens 13 are different and the dispersion of light through the lens 13 varies accordingly along the length of the lens 13.

This variation of dispersion results in a random appearance of light to a passing observer such that, as the observer moves in relation to the light band 10, the light seems to flicker. The effect may be accentuated by external conditions, such as wind striking the face of the lens 13 and causing slight and irregular distortions of the polycarbonate material of the lens 13. If, for example, the lens 13 were red in color, the lens 13 would take on the appearance of a flickering flame.

As seen in FIG. 5, the first predetermined interval 19 is preferably greater than the second predetermined interval 23. The ratio of the first to second predetermined intervals 19 to 23 is preferably approximately ⅔. Preferably, the first predetermined interval 19 is approximately 2½" and the second predetermined interval 23 is approximately 1⅔" with the depth 25 of the corrugation from crest 15 to nadir 17 being approximately ½". Also preferably, as seen in FIG. 4, the height 27 of the lens 13 is approximately 15" and the depth 29 of the housing 11 is approximately 2½".

Continuing to look at FIGS. 4-5, the housing 11 has a rear wall 31 with a lower vertical portion 33 and a forwardly tilted upper portion 35. The base 37 of the housing 11 extends forwardly from the bottom of the lower vertical portion 33 of the rear wall 31 and is turned upward, rearward and upward to form a seat 39 on and against which the lower edge and rear face of the lens 13 rests. The forwardly tilted upper portion 35 of the rear wall 31 extends to an upper channel 41 opposed to the seat 39. The channel 41 has an internal flange 43 which secures the lens 13 in, and against the back inside face of, the channel 41. As can be understood by reference to FIG. 4, the lens 13 can be mounted by sliding longitudinally onto the seat 39 and into the channel 41 or by vertical insertion into the channel 41 and rotation onto the seat 39. The lower portion of the lens 13 is secured against the back of the seat 39 by the upper flange 45 of a facia 47 extending across the front of the upward portion of the base 37.

The linear array of LEDs 21 are mounted on an elongated LED circuit board 51 pitched toward the lens 13 by clips 53 spaced lengthwise in the housing 11 behind the lens 13 and along the junction of the lower portion 33 of the rear wall 31 and the base 37 of the housing 11. The angle 55 of the pitch is approximately 12°.

Figure 6:
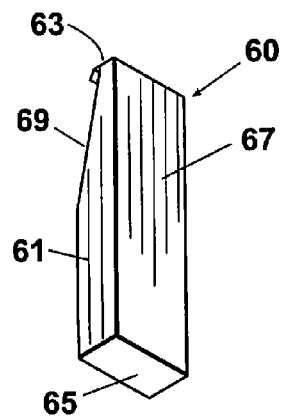
FIG. 6 is a perspective view of a typical end cap for the LED light band of FIG. 1.
Figure 7:
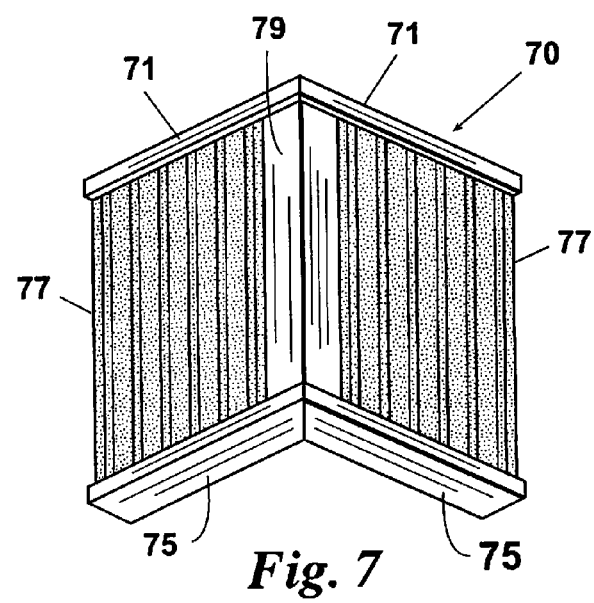
FIG. 7 is a perspective view of an outside corner for the LED light band of FIG. 1.
Figure 8:
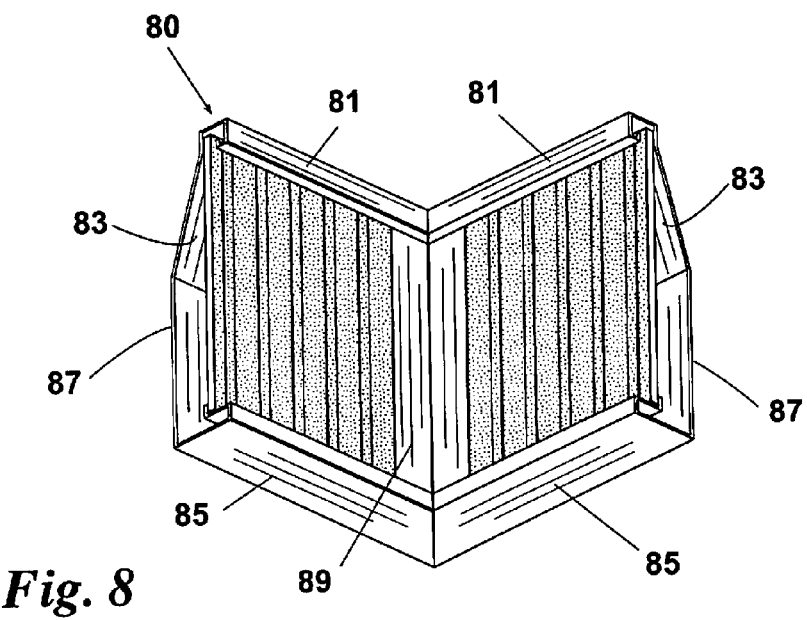
FIG. 8 is a perspective view of an inside corner for the LED light band of FIG. 1.

Turning to FIGS. 6, 7 and 8, accessories for the light band 10 include end caps 60, outside corners 70 and inside corners 80, respectively. The left end cap 60 shown has left end, top, bottom, front and rear walls 61, 63 65, 67 and 69, respectively, contoured to enclose and conform to the left end of a light band 10 inserted into its open right face. The right end cap, not shown, is an opposite hand configuration of the left hand cap 60 shown. The outside corner 70 and inside corner 80 are right angle corners having frames 71/81 identical in cross-sectional configuration, each with a top, a bottom and a side wall 73/83, 75/85 and 77/87, respectively, contoured for insertion into and conformance with the left and right ends of two light bands 10. For the outside corner 70, an outside piece of corner trim 79 completes the junction of the frames 71 and, for the inside corner 80, an outside piece of corner trim 89 completes the junction of the frames 81.

Looking at FIG. 9, one manner of mounting the light band 10 on a parapet P is illustrated. A base plate 91 is secured atop the parapet P, perhaps as shown by an anchor bolt 93. A generally S-shaped mounting bracket 95 has a base portion 97, an upward angled leg 99, a horizontal top 101 and a downward vertical leg 103. The base 37 of the light band 10 is positioned on the horizontal top 101 of the mounting bracket 95 with the front face of the base 37 and the front face of the leg 103 are in a common plane. Nested identical angle irons 105 and 107 are telescoped to a generally desired length adjustable by use of screws 109. The distal ends of the nested angle irons 105 and 107 have flat extensions 111 and 113, respectively. The upper flat extension 111 will be secured to the angled portion 35 of the housing 11, as shown by screws 115. The lower flat extension 113 will be secured to the mounting bracket 95, the parapet P, the mounting plate 91 or such other structure as may be available, depending on the building/parapet structure. As shown, the lower flat extension 113 will be secured between the base portion 97 of the mounting bracket 95 and the base plate 91. This is accomplished by bending the upper flat extension 111 at a point 117 below the screws 115 to generally position the lower flat extension 113 to be secured to the selected support structure. As shown, the lower flat extension 113 is bent at points 119 and 121 as required to accommodate the support structure and, once positioned between the base plate 91 and the mounting bracket 95, is secured by an anchor bolt 123, as shown extending into the parapet P. The bends 117, 119 and 121 and the positions of the screws 109 can then be adjusted to provide a most stable mount for the light band 10. To finish the installation, the facia 47 can be selected to extending across the front of the upward portion of the base 37 and also across the leg 103 of the mounting bracket 95 to the base plate 91 on the parapet P.

A lens 10 suitable for the purposes of this disclosure has been made by starting with a roll, perhaps 450' or more in length, of 15.5" wide×⅛" thick flat polycarbonate stock. The stock is rolled off its drum 7.5' to 8.0' at a time into a sheet metal die press where the desired corrugation is pressed into the unrolled polycarbonate. A 230 T hydraulic press has been found suitable to the purpose. After each 7.5' to 8.0' length is pressed, the press is relaxed to receive the next unrolled 7.5' to 8.0' length of polycarbonate. Preferably, each next length is rolled out only so far as will permit the die to overlap the trailing end of the previous length. As the pressed polycarbonate exits the press it is wound onto a coiler from which it can later be unwound and cut into any length desired.

Thus, it is apparent that there has been provided, in accordance with the invention, a corrugated lens LED light band that fully satisfies the objects, aims and advantages set forth above. While the invention has been described in conjunction with a specific embodiment thereof, it is evident that many alternatives, modifications and variations will be apparent to those skilled in the art and in light of the foregoing description. Accordingly, it is intended to embrace all such alternatives, modifications and variations as fall within the spirit of the appended claims.

What is claimed is:

1. For making an elongated polycarbonate lens having transverse corrugations with crests and nadirs at a predetermined interval, a method comprising the steps of:
   starting with a roll of flat polycarbonate stock;
   unrolling the flat polycarbonate stock in sequential increments into a press having a die contoured to impress the transverse corrugations with crests and nadirs at a predetermined interval;
   pressing each increment unrolled into the die press to impress the transverse corrugations with crests and nadirs at a predetermined interval into the increment;
   relaxing the press to release the pressed increment and receive the next unrolled increment of polycarbonate stock; and
   winding the released increments of pressed polycarbonate stock onto a coiler as they exit the press.

2. A method according to claim 1 further comprising the steps of:
   unwinding the wound polycarbonate stock to a desired length; and
   cutting the unwound polycarbonate stock to a desired length.

3. A method according to claim 1, said step of unrolling the flat polycarbonate stock in sequential increments into a press further comprising the sub-step of limiting the unrolling of each increment so as to permit the die to overlap a trailing end of a previous increment.

* * * * *